US007945905B2

(12) United States Patent
Kumar et al.

(10) Patent No.: US 7,945,905 B2
(45) Date of Patent: May 17, 2011

(54) QUALITY INSPECTOR TOOL

(75) Inventors: Abhishek Kumar, Bandhup (IN);
Harish Easwaran, Thane W (IN);
Ashok D. Pithdaiya, Navimumbai (IN);
Anupam Pandey, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 1384 days.

(21) Appl. No.: 11/446,498

(22) Filed: Jun. 2, 2006

(65) Prior Publication Data

US 2007/0283325 A1    Dec. 6, 2007

(51) Int. Cl.
*G06F 9/44* (2006.01)
*G06F 9/45* (2006.01)

(52) U.S. Cl. ........ 717/143; 717/112; 717/117; 717/142; 717/151

(58) Field of Classification Search .................. None
See application file for complete search history.

(56) References Cited

U.S. PATENT DOCUMENTS

| | | | |
|---|---|---|---|
| 6,772,409 B1 | 8/2004 | Chawla et al. | |
| 6,802,059 B1 * | 10/2004 | Lyapustina et al. | 717/143 |
| 6,973,417 B1 * | 12/2005 | Maxwell et al. | 703/2 |
| 2003/0131284 A1 * | 7/2003 | Flanagan et al. | 714/38 |
| 2004/0003335 A1 * | 1/2004 | Gertz et al. | 714/758 |
| 2004/0111705 A1 * | 6/2004 | Motoyama et al. | 717/126 |
| 2004/0194066 A1 | 9/2004 | Frey et al. | |
| 2004/0223009 A1 | 11/2004 | Szladovics et al. | |
| 2007/0180429 A1 * | 8/2007 | Gogh et al. | 717/126 |

* cited by examiner

*Primary Examiner* — Lewis A Bullock, Jr.
*Assistant Examiner* — Mark A Gooray
(74) *Attorney, Agent, or Firm* — Fish & Richardson P.C.

(57) ABSTRACT

A data processing system, method, and instructions executable on a computer inspect the quality of software code. A summary report is generated that summarizes aspects of the current status of a software project. The summary report may include which portions of code have been written, which have been edited to predetermined standards, and which remain to be written. Errors in the code may be identified. Warnings associated with portions of the code may be generated, as well as suggested changes to the code. For comparison, the suggested code changes may be displayed along side of the corresponding portions of the pre-existing code that the suggested code is intended to replace. Hard coded values may be automatically identified. Text elements corresponding to each hard coded value may be automatically created. Subsequently, each hard coded value may be automatically replaced by the corresponding text element. Revisions to pre-existing code may be inspected.

21 Claims, 11 Drawing Sheets

QUALITY INSPECTOR To INSPECT ABAP Code Quality

Transport Request Number — JD1K929862

☐ Analyse above object for Transport Request

Check Points

| | | | |
|---|---|---|---|
| INTERNAL TABLES | TUTY | LOCAL INTERNAL TABLE | GHJ5 |
| GLOBAL STRUCTURES | W_ | LOCAL STRUCTURES | LW_ |
| GLOBAL VARIABLES | V_10 | LOCAL VARIABLES | LV_ |
| PARAMETERS | P_ | SELECT-OPTIONS | S_ |
| FIELD-GROUPS | G_ | LOCAL FIELD-GROUPS | G_ |
| FIELD-SYMBOLS | F_ | LOCAL FIELD-SYMBOLS | F_ |
| CONSTANTS | C_ | LOCAL CONSTANTS | LC_ |
| RANGES | R_ | LOCAL RANGES | LR_ |
| FORM PARAMETER | X_ | PERFORM | YHYY |
| LOCAL PERFORM | F_ | Development Class | sort |
| Program documentation done | ☐ | Check Main Request ID | KUMARA |

Installation Details

Installation Key ____ Installation Ref. No 2525-MB1A-Y8A5

Software Version

Version 2.88  Created by  Abh1shek  On 13.89.2884

[CUSTOMISE YOUR TOOL]

Others Features

Customization Key ••••    [REMOVE HARD CODINGS]

```
REPORT zt_tips .
CONSTANTS: lc_const VALUE '3' .     * NO Hard Coding
CASE '123)' .                        * Hard Coding
WHEN sy-subrc.
   WRITE: '12356('.                  * Hard Coding
ENDCASE.
```

Fig. 3

QUALITY INSPECTOR To INSPECT ABAP Code Quality

SUMARRY REPORT

| | |
|---|---|
| Proposed Changes in Code | 24 |
| Proposed New TEXT Elements | 24 |

| TEXT NO. | PROPOSED TEXT ELEMENT |
|---|---|
| TEXT-040 | Abhishek |
| TEXT-008 | 2.89 |
| TEXT-009 | ?T-E(0)1\A |
| TEXT-100 | DATA: BEGIN of tabline OCCURS 0, |
| TEXT-101 | ENDFORM. |
| TEXT-102 | ENDLOOP. |
| TEXT-103 | Errorll Trying to copy this Utility, Please install |
| TEXT-104 | FROM DATABASE indx(rt) ID 41. |
| TEXT-105 | GENERATE SUBROUTINE POOL tabline NAME 43. |
| TEXT-106 | IMPORT tabline |
| TEXT-110 | Installation key is Wrong or Expired |
| TEXT-111 | Installation key is Blank |
| TEXT-112 | LOOP AT tabline. |
| TEXT-113 | MODIFY tabline INDEX sy-tabix. |
| TEXT-114 | Quality Inspector |
| TEXT-115 | TRANSLATE tabline-line USING 42. |
| TEXT-116 | ThUserInfo |
| TEXT-117 | define AB. |
| TEXT-118 | end-of-definition. |
| TEXT-119 | line(72), |
| TEXT-120 | prog |
| TEXT-121 | prog1 |
| TEXT-122 | report ztabh1. |
| TEXT-123 | tname1 tname2 tname3 tname4 tname5 tname6 tname7. |

Fig. 5

QUALITY INSPECTOR To INSPECT ABAP Code Quality

```
abh1 'QIPART1'.
perform screen.
if v_flag = space.                              * To setup the selction screen
  main_prog = sy-repid.
  perform check_installation in progress (tname1)
    using countnum p_cname main_prog if found.
  perform upload_conventions.
  perform populate_conventions.                 * To Populate Selection Screen
  read table imt_headers with key name = sy-uname ch = 'X'.
  if sy-subrc = 0.
    message s126(z1) with text-015.
    * Sorry_!_You_are_not_authorised_to_use
    leave program.                              * sy-subrc
  endif.
  leave to list-processing.
  leave list-processing.                        * v_flag
endif.
*-> TEXT-128 => prog
  get parameter id TEXT-128 field p_prog.
*-> TEXT-121 => progr
  get parameter id TEXT-121 field p_progr.
  get parameter id 'TR' field p_reqno.
  s1.
END-OF-DEFINITION.        * st_selection_screen_output
*-&
*-&                Form  AT_SELECTION_SCREEN
*-&
DEFINE st_selection_screen.
  s1.
  perform atselectionscreen in program (tname5)
    tables imt_headers
           imt_inc
           imt_table
```

|  | |
|---|---|
| | INSERTED |
| | MODIFIED |
| | INSERTED |
| | MODIFIED |

```
abh1 'QIPART1'.
perform screen.
if v_flag = space.                              * To setup the selct
  main_prog = sy-repid.
  perform check_installation in progress (tname1)
    using countnum p_cname main_prog if found.
  perform upload_conventions.
  perform populate_conventions.                 * To Populate Sele
  read table imt_headers with key name = sy-uname ch = ' '.
  if sy-subrc = 0.
    message s126(z1) with text-815.
    * Sorry_!_You_are_not_authorised_to_use
    leave program.                              * sy-subrc
  endif.
  leave to list-processing.
  leave list-processing.                        * v_flag
endif.
  get parameter id 'prog' field p_prog.
  get parameter id 'progr' field p_progr.
  get parameter id 'TR' field p_reqno.
  s1.
END-OF-DEFINITION.        * st_selection_screen_output
*-&
*-&                Form  AT_SELECTION_SCREEN
*-&
DEFINE st_selection_screen.
  s1.
  perform stselectionscreen in program (tname5)
    tables imt_headers
           imt_inc
           imt_table
```

QUALITY INSPECTOR To INSPECT ABAP Code Quality

810 —

| A Quality Check for Progam ZA_MESSAGE | | | |
|---|---|---|---|
| CHECK_POINTS | ERRORS | WARNINGS | SUGGESTIONS |
| BEAUTIFICATION ASPECT | 51 | 229 | 31 |
| TYPE PREFERED THAN LIKE | 0 | 27 | 0 |
| INTERNAL TABLE | 5 | 0 | 0 |
| VARIABLES | 47 | 0 | 0 |
| LOCAL VARIABLES | 3 | 0 | 0 |
| FIELD-SYMBOLS | 1 | 0 | 0 |
| CONSTANTS | 33 | 0 | 0 |
| FORM PARAMETERS | 0 | 0 | 0 |
| HARD CODING | 0 | 63 | 93 |
| OTHERS | 0 | 1 | 0 |
| SY-SUBRC CHECK | 0 | 11 | 0 |
| PERFORM | 7 | 0 | 0 |
| LOCAL PERFORM | 5 | 0 | 0 |
| MULTIPLE PHRASES IN ONE LINE | 0 | 0 | 0 |

812 —

| SUMMARY | | |
|---|---|---|
| Lines in INCLUDE/PROGRAM | FROM | To |
| Total source line scaned | 1 | 1,889 |
| IEANS600 | 4 | 232 |
| ZA_BOOLEAN | 234 | 237 |
| ZA_CCB_CONSTANTS | 239 | 757 |
| MAC_MSG_PUTX_ME | 845 | 858 |
| MAC_MSG_REPEAT | 871 | 884 |
| MAC_MSG_PUTX_ME | 889 | 928 |
| MAC_MSG_PUTX_ME | 922 | 933 |
| MAC_MSG_PUTX_ME | 938 | 947 |
| MAC_MSG_PUTX_ME | 1,005 | 1,016 |
| MAC_MSG_PUTX_ME | 1,024 | 1,035 |
| MAC_MSG_PUTX_ME | 1,041 | 1,052 |
| MAC_MSG_PUTX_ME | 1,058 | 1,069 |
| MAC_MSG_PUTX_ME | 1,076 | 1,087 |

814 —

| List of Used Variables | |
|---|---|
| Type of Variables | Total |
| INTERNAL TABLE | 3 |
| VARIABLES | 27 |
| LOCAL VARIABLES | 2 |
| PARAMETERS | 0 |
| FIELD-SYMBOLS | 1 |
| CONSTANTS | 548 |
| LOCAL CONSTANTS | 1 |
| PERFORM | 7 |
| LOCAL PERFORM | 5 |
| Total Number of Variables | 682 |

```
Total time taken in analysis      (SEC) :    7.5771
Total time taken in reading       (SEC) :    0.1489
Total time taken in Writting the List (SEC) :  0.0371
```

Fig. 8

| QUALITY INSPECTOR To INSPECT ABAP Code Quality | | |
|---|---|---|
| Sl No | SY-SUBRC CHECK | Error Description |
| 1 | ZTBC_CHGPTR_PROC | No SY-SUBRC found after SELECT SINGLE |
| 2 | GT_MESTYPE_COUNTS | No SY-SUBRC found after read table |
| 3 | GT_MESTYPE_COUNTS | No SY-SUBRC found after read table |
| 4 | 'Z_CDA_SAMPLE_CHGPTR_PROCESSIN | No SY-SUBRC found after Call FM |
| 5 | 'MS6_ACTION' | No SY-SUBRC found after Call FM |
| 6 | 'CHANGE_POINTERS_STATUS_WRITE' | No SY-SUBRC found after Call FM |
| 7 | 'CHANGE_POINTERS_READ_MODE_SET | No SY-SUBRC found after Call FM |
| 8 | 'CHANGE_POINTERS_READ_MODE_SET | No SY-SUBRC found after Call FM |
| 9 | 'CHANGE_POINTERS_READ_MODE_SET | No SY-SUBRC found after Call FM |
| 10 | 'CHANGE_POINTERS_READ' | No SY-SUBRC found after Call FM |
| 11 | 'CHANGE_POINTERS_READ' | No SY-SUBRC found after Call FM |

Fig. 9

| Checking Points | Conventions | ON/OFF |
|---|---|---|
| INTERNAL TABLE | ST_ | ☑ |
| LOCAL INTERNAL TABLE | LT_ | ☑ |
| STRUCTURE | SX_ | ☑ |
| LOCAL STRUCTURE | LX_ | ☑ |
| VARIABLES | SV_ | ☑ |
| LOCAL VARIABLES | LV_ | ☑ |
| PARAMETERS | P_ | ☑ |
| SELECT-OPTIONS | S_ | ☑ |
| FIELD-GROUPS | FG_ | ☑ |
| LOCAL FIELD-GROUPS | FG_ | ☑ |
| FIELD-SYMBOLS | FS_ | ☑ |
| LOCAL FIELD-SYMBOLS | FS_ | ☑ |
| CONSTANTS | GC_ | ☑ |
| LOCAL CONSTANTS | LC_ | ☑ |
| RANGES | R_ | ☑ |
| LOCAL RANGES | R_ | ☑ |
| FORM PARAMETERS | F_ | ☑ |
| PERFORM | SUB_ | ☑ |
| LOCAL PERFORM | SUB_ | ☑ |
| DEVELOPMENT CLASS | ABHI | ☑ |
| TABLE TYPES | TY_ | ☑ |
| LOCAL TABLE TYPES | TY_ | ☑ |
| STRUCTURE TYPES | TY_ | ☑ |
| LOCAL STRUCTURE TYPES | TY_ | ☑ |
| VARIABLE TYPES | TY_ | ☑ |
| LOCAL VARIABLE TYPES | TY_ | ☑ |
| TABLES | | ☑ |
| LOCAL TABLES | | ☑ |
| VARIABLE INITILAIZATION | | ☑ |
| HARD CODING | | ☑ |
| SELECT SINGLE | | ☑ |
| CHECK FOR NESTED SELECT | | ☑ |
| SELECT ORDER | | ☑ |
| SY-SUBRC CHECK | | ☑ |
| CHECK FOR NESTED LOOP | | ☑ |
| LOOP WITH CONDITIONS | | ☑ |
| TYPE PREFERED THAN LIKE | | ☑ |
| BEAUTIFICATION ASPECT | | ☑ |
|     BLANK LINES BTW CODE & COMMENT | | ☑ |
|     COMMENT ALIGNMENT WITH CODE | | ☑ |
|     EXTRA DOTS IN ONE LINE | | ☑ |
| MULTIPLE PHRASES IN ONE LINE | | ☑ |
|     SELECT & WHERE | | ☑ |
|     SELECT & INTO | | ☑ |
|     SELECT & ENDSELECT | | ☑ |
|     SELECT & AND | | ☑ |
|     SELECT & OR | | ☑ |
|     FROM & WHERE | | ☑ |
|     FROM & INTO | | ☑ |
|     FROM & ENDSELECT | | ☑ |
|     FROM & AND | | ☑ |
|     FROM & OR | | ☑ |
|     WHERE & INTO | | ☑ |
|     WHERE & AND | | ☑ |
|     FROM & ENDSELECT | | ☑ |
|     IF & AND | | ☑ |
|     AND & OR | | ☑ |
|     IF & OR | | ☑ |
|     IF & ENDIF | | ☑ |
| OTHERS | | |
| Restricted User:- | | |
| Restricted User:- | | |
| Restricted User:- | | |

QUALITY INSPECTOR To INSPECT ABAP Code Quality

Fig. 10

QUALITY INSPECTOR TOOL

FIELD OF THE INVENTION

This invention relates generally to inspecting the quality of software. More particularly, the invention relates to software tools that enhance the processes of writing and/or editing code, as well as verifying predetermined coding standards.

BACKGROUND OF THE INVENTION

Software programs may be written in various programming languages. Additionally, multiple programmers may write and/or edit the code for a single software application. The multiple programmers may work on the code from geographically dispersed locations.

With multiple programmers writing and/or editing code for a single software application, difficulties and inefficiencies may arise. For instance, with conventional software tools, there may be no way for multiple programmers to effectively communicate the current "status" of the code to one another. Hence, with typical software tools, time may be unnecessary expended as each individual programmer, before beginning to work on a software project, is required to review the work of the other co-programmers working on the same project to determine the project's current status.

Other inefficiencies also may arise when multiple programmers write and/or edit the code associated with a single application. For example, one programmer may draft a portion of the code that builds upon and/or uses unfamiliar code that was drafted by someone else. However, drafting code that relies upon unfamiliar code may increase the number of coding errors in the subsequent code due to a lack of thorough understanding of the unfamiliar code, including its detailed operation and naming conventions.

Moreover, when numerous programmers are involved with the process of editing the code for a single application, one programmer may be required to edit unfamiliar code that was drafted by another. Due to that programmer's unfamiliarity with that code, coding errors in the unfamiliar code may not be easily and/or initially recognized. As such, with multiple programmers editing code, some code defects may not be identified until the final stages of the code development. This may create additional inefficiencies, as each unidentified coding error may mask other additional coding errors associated with code called later in the program. In other words, each unidentified coding error may prevent one or more additional coding errors from being timely identified.

Conventional code editors may provide editing tools that are either ineffective or not user friendly. Conventional code editors also may not generate programming warnings and suggestions, the programming suggestions intended to replace certain portions of pre-existing code that may not be written per predetermined coding standards and/or cause runtime/operational difficulties. Furthermore, certain programming languages permit programming with "hard coded," or otherwise fixed, values. A typical programming language also may permit programming according to pre-determined programming structures. However, conventional editors provide only limited functionality associated with hard coded values and/or programming structures.

Therefore, there is a need for a tool that facilitates increased communication between multiple programmers developing a single software application such that the code may be written and/or edited more efficiently. There is also a need for a tool that tracks the current status of a software project as it is being developed, as well as provides additional enhancements associated with writing and/or editing software.

The present invention alleviates one or more of the shortcomings described above.

BRIEF SUMMARY

By way of introduction, the embodiments described below include methods, processes, apparatuses, instructions, or systems for inspecting the quality of software code. The invention provides a data processing system and method that facilitates tracking the current status of the development of a software project and enhances the writing and/or editing of the code by one or more programmers. The current status of the code may entail an identification of which portions of an application have been written per predetermined standards, the remaining programming errors and warnings, and which portions of that application remain to be written and/or edited. The data processing system utilizes a Quality Inspector Tool that presents an easy to comprehend summary of analysis of particular aspects of the code for the software application being developed. By tracking the status of the project and presenting information summarizing the status, inefficiencies in the development of the code may be alleviated.

In one aspect, a data processing system for automatically inspecting code quality is provided. The system may include a processor unit operable to automatically identify a programming error associated with a first portion of a first version of a software program written in a programming language, the first portion being improperly written according to programming rules governing the programming language. The processor unit also may be operable to automatically generate a programming warning associated with a second portion of the first version of the software program that may impede with the proper execution of the software program, and to automatically generate a programming suggestion containing suggested code written in the programming language operable to replace a corresponding portion of code in the first version of the software program. The system may include a display operable to present the suggested code generated by the processing unit along side the corresponding portion of code in the first version of the software program for comparison. The processing unit may be operable to insert the suggested code into the first version of the software program such that the suggested code replaces the corresponding portion of code in the first version of the software program to create an updated version of the software program.

In another aspect, a computer-readable medium having instructions executable on a computer stored thereon is provided. The instructions include identifying a hard coded value in a first version of a software program written in a programming language and creating a text element corresponding to the hard coded value. The instructions also may include replacing at least one instance of the hard coded value in the first version of the software program with the text element to create an updated version of the software program.

In another aspect, a method of automatically inspecting code quality is provided. The method may include automatically identifying a hard coded value in a first version of a software program written in a programming language and automatically creating a text element corresponding to the hard coded value. The method also may include automatically replacing at least one instance of the hard coded value in the first version of the software program with the text element to create an updated version of the software program.

In yet another aspect, a method of automatically inspecting code quality is provided. The method may include automatically identifying a programming error associated with at least one programming aspect of a software program written in a programming language, the programming error indicating a first portion of code being improperly written according to programming rules governing the programming language, and automatically generating a programming warning associated with the at least one programming aspect of the software program, the programming warning indicating a second portion of code that may impede the proper execution of the software program. The method also may include automatically generating a programming suggestion associated with the at least one programming aspect of the software program, the programming suggestion containing suggested code written in the programming language. The suggested code may modify pre-existing lines of code already in the software program, and add new lines of code and/or delete other pre-existing lines of code from the software program.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are illustrative in nature and not restrictive.

BRIEF DESCRIPTION OF THE DRAWINGS

The present embodiments will become more fully understood from the detailed description given herein below and the accompanying drawings which are given by way of illustration only, and are not limitative of the present invention, and wherein:

FIG. 2 shows an exemplary selection screen that the Quality Inspector Tool may employ;

FIG. 3 illustrates exemplary hard coded values associated with a software program;

FIG. 5 illustrates an exemplary report presenting proposed text elements that may be created for each hard coded value identified;

FIG. 6 illustrates an exemplary display highlighting the changes to the code proposed by the Quality Inspector Tool;

FIG. 7 illustrates another exemplary display highlighting the changes to the code proposed by the Quality Inspector Tool;

FIG. 8 illustrates an exemplary summary report of code irregularities;

FIG. 9 illustrates an exemplary report detailing the code irregularities associated with a predetermined error category;

FIG. 10 illustrates an exemplary customization report; and

DETAILED DESCRIPTION

Figure 1:
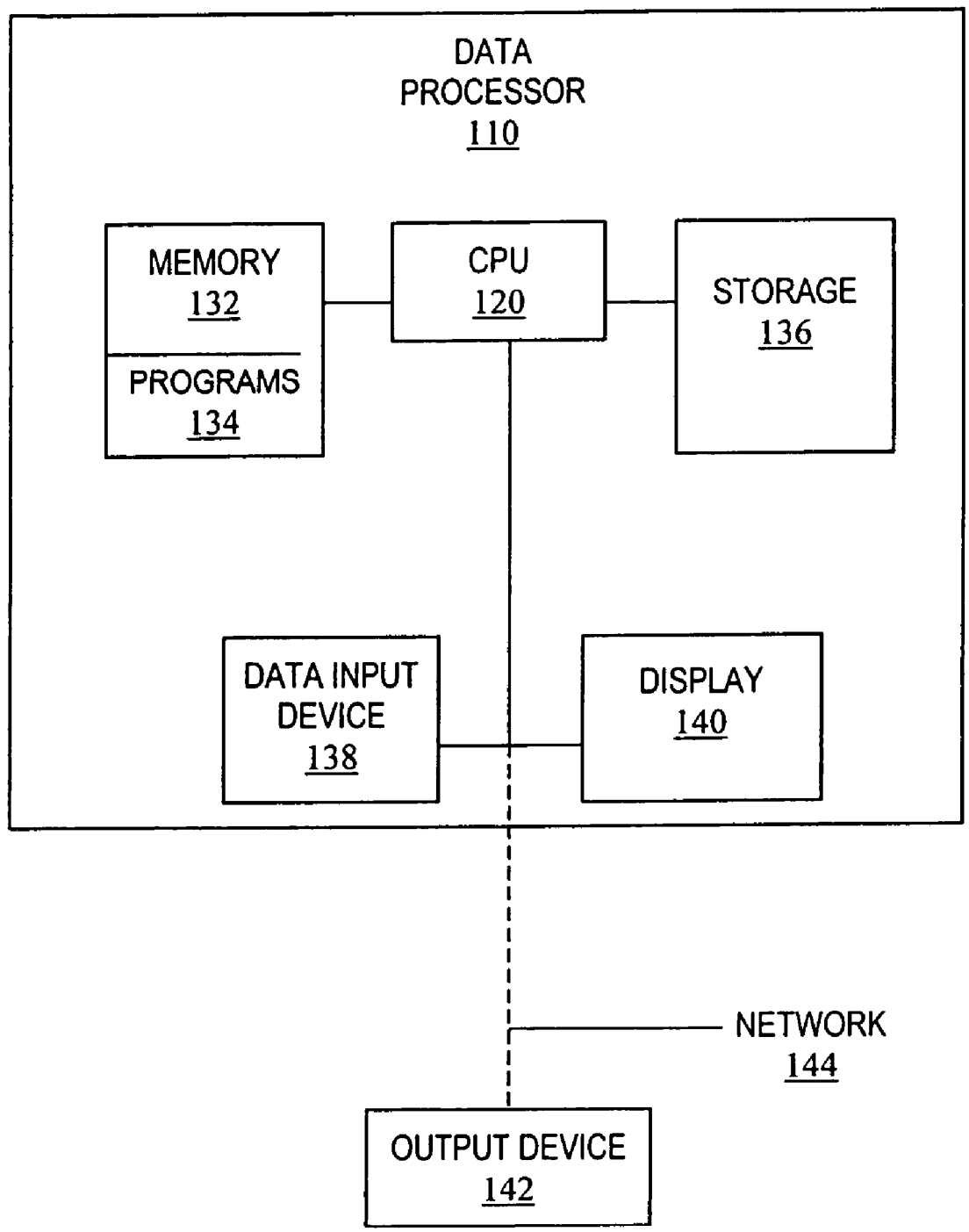
FIG. 1 shows an exemplary data processing system that implements the Quality Inspector Tool.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the Quality Inspector Tool technology may be stored on or read from other machine-readable media, including secondary storage devices such as hard disks, floppy disks, and CD-ROMS; electromagnetic signals; or other forms of machine readable media either currently known or later developed.

Furthermore, although this specification describes specific components of a Quality Inspector Tool ("Quality Inspector"), methods, systems, and articles of manufacture consistent with the Quality Inspector may include additional or different components. For example, a processor may be implemented as a microprocessor, microcontroller, application specific integrated circuit (ASIC), discrete logic, or a combination of other types of circuits acting as explained herein. Databases, tables, and other data structures may be separately stored and managed, incorporated into a single memory or database, or generally logically and physically organized in many different ways. The programs and logic discussed below may be parts of a single program, separate programs, or distributed across several memories and processors.

The Quality Inspector provides for the automated review of code. During the development of a software application, the Quality Inspector may generate one or more reports detailing which of the components for the application have not been written as per predetermined project and/or programming standards. The Quality Inspector enhances the process of reviewing the software code, facilitates satisfying predetermined programming standards to be followed by a software project, lowers the number of programming errors, and reduces the time expended by programmers developing the code.

For example, previously difficulties arose when multiple programmers were writing and/or editing the code for a single application. Each programmer would have to expend time reviewing the code to learn the current "status" of the project before commencing work. However, the Quality Inspector may automatically track the current status of the development of a software project and present that status via a display or other output device. The Quality Inspector may track which portions of code for a software application have been written and/or edited, which portions satisfy pre-determined project coding standards, and which portions still contain programming errors and may not operate as expected during runtime. The predetermined project coding standards may include user specific standards, modules/routines providing user identified functionality to be written and edited, programming rules governing a programming language, or other predetermined standards.

Developing a new program or a revision to a pre-existing program may result in semantic or syntax errors. Semantic errors may be more difficult to detect and may only be traced during testing of the program under real world conditions. Hence, the Quality Inspector may generate a summary report listing runtime, semantic, syntax, and other errors in the code. The report also may present one or more warnings associated with specific portions of the code. The report may further suggest changes for specific portions of the code. The errors, warnings, and suggested changes may be associated with the same or different portions of the code. For instance, a single line of code identified by line number may have a corresponding error, warning, and suggested change. In operation, the Quality Inspector has been seen to reduce the time needed to review and edit the code for an application by approximately 30%.

Accordingly, the Quality Inspector may alleviate difficulties associated with conventional software editors, especially when multiple programmers are drafting and/or editing code. Previously, the time expended reviewing code may have been substantial. The defect injection rate, i.e., the total number of defects or errors when compared to the total time expended on the software project, typically exceeded the target established for a specific project. Additionally, the process of reviewing the code was inefficient and/or ineffective as some code defects were not identified upon the initial review of the corresponding portion of code, but rather would only be identified during later stages of debugging.

I. Exemplary Data Processing System

FIG. 1 is a block diagram of an exemplary data processor 110 configured or adapted to provide functionality for implementing software applications, including the Quality Inspector Tool as discussed herein. The data processor 110 may include a central processing unit (CPU) 120, a memory 132, a program 134, a storage device 136, a data input device 138, and a display 140. The data processor 110 also may have an external output device 142, which may be a display, a monitor, a printer and/or a communications port. The data processor 110 may be a personal computer, work station, server, remote terminal, or other system.

The data processor 110 may be interconnected to a network 144, such as an intranet, the Internet, or an intranet connected to the Internet. The data processor 110 may be interconnected to another location via the network 144 either by data lines or by wireless communication. The data processor 110 may direct that the data received be stored on or read from machine-readable medium, including secondary storage devices such as hard disks, floppy disks, CD-ROMS, and DVDs; electromagnetic signals; or other forms of machine readable medium, either currently known or later developed. The data processor 110 is provided for descriptive purposes and is not intended to limit the scope of the present system. The data processor may have additional, fewer, or alternative components.

A program 134 may reside on the memory 132 and include one or more sequences of executable code or coded instructions that are executed by the CPU 120. The program 134 may be loaded into the memory 132 from the storage device 136. The CPU 120 may execute one or more sequences of instructions of the program 134 to process data. The program 134 may provide functionality associated with the Quality Inspector and other functionality as discussed herein.

As shown in FIG. 1, the program 134 may permit a user to enter data into the data processor 110 via the data input device 138, the display 140, the network 144, or another input device. The data input device 138 may be a keyboard, a mouse, a touch pad, a touch screen, a haptic or other vibration feedback device, a light pen, a voice recognition device, or other input device. The display may be a display screen, a touch screen, a haptic device, or other output device. After the data is received, the data may be stored in the memory 132, the storage device 136, or other storage unit. Additionally, the data processed by the data processor 110 may be provided as an output to the display 140, the external output device 142, the network 144, and/or stored in a database.

The display 140 may contain elements and functionality provided and supported by any windowing system interface including a title bar, a status bar, window maximize, minimize, close, move and other window controls and functionality. All of the windows may be designed using Hypertext Markup Language (HTML) and Active Server Pages (ASP). Any operating system, graphical user interface, and/or information markup and layout languages also may implement and support the display screen.

In one embodiment, data may be received via the network 144 or other network with which other devices are interconnected. The data processor 110 may receive and store the data received in the memory 132, the storage device 136, or other storage unit. The program 134 may direct that the data received be stored on or read from machine-readable medium, including secondary storage devices such as hard disks, floppy disks, CD-ROMS, and DVDs; electromagnetic signals; or other forms of machine readable medium, either currently known or later developed.

The network 144 may connect to one or more user sites. The user sites may include endpoints such as computers, cell phones, and/or Personal Data Assistants communicating with other endpoints over a dial-up modem, DSL, T1, or other network connection with the data processing system 110. The user sites may represent local or remote locations where a user may access the data processing system 110 from the network 144.

II. Exemplary Programming Language and Modules

In one embodiment, the Quality Inspector Tool provides automated review of an ABAP ("Advanced Business Application Programming") program, including inspecting Include programs or statements, subroutines, and function modules, and generating corresponding online reports. Initially, ABAP began as a reporting language in the mainframe world but subsequently has developed into a complete language that supports dialog and transaction programming. Today, ABAP has become a modem object-orientated programming language that is portable and globally applicable, as well as offering functionality directed toward control and web-based applications.

In general, ABAP may be embedded within a complete development environment. ABAP may be associated with repositories, editors, and other software tools needed for complex software projects. For instance, ABAP may include a typical ABAP editor, ABAP dictionary, ABAP workbench, GUI, or other tools. Modem versions of ABAP, including ABAP/4 and ABAP Objects, may be seamlessly integrated with other object models.

ABAP is the programming language for SAP, including the SAP R/3 system, for business applications. Accordingly, an ABAP program may access a central database associated with an SAP application server to retrieve external data and/or various functionality related to SAP applications. More specifically, the SAP R/3 system is a package of integrated allocations called functional modules that record and track business activities and various costs associated with the business activities. An exemplary SAP R/3 architecture may include the functional modules, a SAP database, and a graphical user interface (GUI) associated with remote computer terminals. The modules, database, and terminals may all be virtually or otherwise effectively interconnected.

The SAP functional modules may be discrete software packages directed toward particular tasks, such as inventory control, payroll management, and accounting. The database may be a database of business data. The business data may be stored on one or more database servers. The GUI may appear on the display screens of computer terminals that are used to access the software. The GUI may provide an application window by which a user may enter commands and/or data via an input device, such as a keyboard, mouse, or other input means.

Some examples of SAP functional modules may include personal management, time management, personnel development, sales and distribution, control, project system, materials management, plant maintenance, and financing accounting modules. The personal management module may provide functionality related to managing and/or reporting employee data, benefits, salaries and other employee information. The time management module may provide functionality related to managing and reporting employee time data, such as time data associated with the payroll. The personnel development module may provide functionality related to managing and reporting seminars, business events, and training courses.

The sales and distribution module may provide functionality related to managing and reporting product prices, outstanding orders, and delivery, as well as analyzing data associated with production and profits. The control module may provide functionality related to managing and reporting departmental costs and budgets. The material management module may provide functionality related to managing and reporting inventories. The project system module may provide functionality that provides analysis of all aspects of a specific project. The plant maintenance module may provide functionality related to the inspection and maintenance of plants and equipment. The financial accounting modules may provide functionality related to managing and reporting costs and budget planning. Additional, fewer, or alternative modules may be used.

In one embodiment, the Quality Inspector is a more generic, more user friendly, and more versatile tool than typical editors such that every project intended for use with a SAP R/3 system may utilize it, resulting in saved time and effort. Additionally, one of the main commands used by the Quality Inspector may be the SCAN command. The SCAN command may divide the ABAP code into tokens and/or statements. Three main internal tables may be employed. One table may be used to upload naming convention and standards. A second table may be used to store ABAP code as tokens. A third table may be used to generate and display results, such as listing each code component or programming aspect along with any corresponding anomaly associated with each respective component.

III. Exemplary Embodiments of the Quality Inspector Tool

The Quality Inspector Tool may provide more features and flexibility as compared with conventional code inspection techniques. For instance, the Quality Inspector may provide a user-friendly selection screen where project specific naming conventions and standards can be customized based upon project requirements and user preferences. The selection screen may permit the user to customize the Quality Inspector to better suit his or her needs. Moreover, the Quality Inspector may not be limited to handling new software applications, but also may be used to facilitate "Change Requests," i.e., revisions to pre-existing programs. The Quality Inspector may inspect changes to code entered by different programmers working on the same program by accepting a transport request number associated with the program via the selection screen.

A. Selection Screen

The user-friendly selection screen may allow project specific naming conventions and standards to be customized. The Quality Inspector may locally store the project specific settings and naming conventions, alleviating the need to access a remote database. Alternatively, project specific settings and naming conventions may be retrieved from a remote database. Alternate manners of specifying project specific settings and naming conventions may be used.

FIG. 2 is an exemplary Selection Screen 200 that may be used by the Quality Inspector. The Selection Screen 200 may include a Transport Request Number 210 window, a Check Points 212 window, an Installation Details 214 window, a Software Version 216 window, and an Other Features 218 window. The Selection Screen 200 may include additional, fewer, or alternative components.

Unlike conventional editors, the Quality Inspector may not inspect new ABAP programs, but also inspect the code associated with a "Change Request," which is a revision or upgrade to a pre-existing ABAP program. Before inspecting the code associated with a Change Request, the Quality Inspector may ask for a transport request number associated with a specific revision of a software program or Change Request via the Selection Screen 200. In operation, on the Selection Screen 200, the GUI may ask for a transport request number that identifies the transport file.

After the transport request number identifying the Change Request has been entered by a user, the Quality Inspector may analyze and summarize the changes made to the program by the code associated with the Change Request. Moreover, throughout the development of an application, the Quality Inspector may track every change to an application associated with a specific transport request number and flag the developer who initiated each request.

FIG. 2 illustrates an exemplary Transport Request Number 210 window that the Selection Screen 200 may employ. A transport request number, such as JD1K929882 in the example shown, may be entered by a user via the Transport Request Number 210 window. The Quality Inspector may use the transport request number entered to facilitate identifying changes to code worked on by different programmers for the same ABAP program. For instance, each transport request number may be associated with a specific project. Alternate transport request numbers may be used.

In one embodiment, for a specified program, there may be multiple transport requests. The Quality Inspector may store all the of the transport request numbers in an internal table. The numbering of the transport request numbers may increase sequentially until an uppermost limit is reached. For each request number, the Quality Inspector may select a request identification number from a database table, such as table "E070," and if the code associated with the request is written per predetermined project standards, the Quality Inspector may proceed to the reviewing the code associated with the next request, otherwise a warning may be generated.

The Selection Screen 200 may provide a Check Points 212 window that identifies one or more programming aspects that the Quality Inspector will automatically review and/or check. As shown in FIG. 2, the programming aspects may include internal tables, global structures, global variables, parameters, field-groups, field-symbols, constants, ranges, form parameters, local performance, local internal tables, local structures, local variables, select-options, local field-groups, local field-symbols, local constants, local ranges, performance, and development class checks. The programming aspects may include additional, fewer, or alternative checks.

For example, in one embodiment, the programming aspects may include checking for documentation, as shown in FIG. 2. At the Selection Screen 200, the programmer may have the option of whether or not to perform the documentation check. If the documentation check is desired by a user, the user may mark the "Program documentation done" or another box on the Selection Screen 200. After which, the Quality Inspector may query the database table DOKTL, or another database table, with the appropriate key language and program name to perform the documentation check.

In another embodiment, the programming aspects checked may include the capability of analyzing the main program. As shown in FIG. 2, the Selection Screen 200 may include a space to enter a Main Request ID, which may identify the person initiating the check of the main program, such as Kumara in the example shown. Alternate main request identifications may be used.

A typical "main" program may call one or more Include programs or statements, or other functions/modules. While analyzing the main program, the Quality Inspector may perform analysis for each Include program used in the main program. Additionally, with respect to the Change Requests discussed above, the Quality Inspector may provide functionality for identifying changes made to each Include program, as well as the changes made to the main program. Alternatively, the Quality Inspector may provide functionality for identifying changes made in each function/module called by main program, such as a main program written in ABAP, as well as the changes made to the main program. Additional, fewer, or alternative programming changes may be identified and reviewed.

In one embodiment, a database table, such as the table TADIR, is used to find the development class. In practice, the database table should be initially cleared before use. If a database table is used without clearing it before hand, the Quality Inspector may generate an appropriate error message indicating that the database table has not been cleared as of yet.

ABAP contains a set of predefined data objects referred to as system fields. System fields may be filled during runtime. Additionally, system fields may be checked during runtime to determine the status of the system. The names and data types of the system fields may be defined by an ABAP dictionary.

Table I below is a table of exemplary predefined ABAP data objects. For each type of data object, the Quality Inspector may check the naming conventions based upon the customization selected by a user. The Quality Inspector may perform "clear" and "refresh" functionality based upon the type of data object, as well as generate an appropriate error message if one or more of the checks is not satisfied. The naming convention, clear, and refresh functionality may be used singly or in combination for each of the data objects. Additional, fewer, or alternative data objects may be used other than those identified in Table I below.

TABLE I

DATA OBJECTS

| Data Type | Naming Convention Check | CLEAR Check | REFRESH Check |
|---|---|---|---|
| INTERNAL TABLES | Y | Y | Y |
| LOCAL INTERNAL TABLE | Y | Y | Y |
| GLOBAL STRUCTURES | Y | | |
| LOCAL STRUCTURES | Y | | |
| GLOBAL VARIABLES | Y | Y | |
| LOCAL VARIABLES | Y | Y | |
| PARAMETERS | Y | | |
| SELECT-OPTIONS | Y | | |
| FIELD-GROUPS | Y | | |
| LOCAL FIELD-GROUPS | Y | | |
| FIELD-SYMBOLS | Y | | |
| LOCAL FIELD-SYMBOLS | Y | | |
| CONSTANTS | Y | | |
| LOCAL CONSTANTS | Y | | |
| RANGES | Y | | |
| LOCAL RANGES | Y | | |
| PERFORM | Y | | |
| LOCAL PERFORM | Y | | |
| FORM PARAMETER | Y | | |
| TABLES TYPES | Y | | |
| LOCAL TABLE TYPES | Y | | |
| STRUCTURES TYPES | Y | | |
| STRUCTURES TYPES | Y | | |
| DATA TYPES | Y | | |
| DATA TYPES | Y | | |

The Quality Inspector may be easily installed. In one embodiment, the Quality Inspector may automatically perform the installation the first time that the execution of the program is requested. Hence, the need to create TEXT, SELECTION TEXTS, PF-STATUS, or other elements for installation may be alleviated. Additionally, the Quality Inspector code may be stored in encrypted form. For example, after installation, the Quality Inspector code may reside in a memory associated with a SAP system or other memory in encrypted form such that the probability of unauthorized access to the application and/or the Quality Inspector code itself is reduced.

FIG. 2 illustrates an exemplary Installation Details 214 window that may be used to install the Quality Inspector. As shown in FIG. 2, the Installation Details 214 window may include an installation key and/or an installation reference number. The key and/or reference number singly or in combination may operate as a password and provide security functionality such that unauthorized personnel may not update or access the software. Additional, fewer, or alternative functionality may be provided via the installation details window.

The Quality Inspector may store the name of the last checked program in a memory such that whenever a user begins to use the Quality Inspector, the name of the last checked program is displayed on the selection screen. A report associated with the last checked program may be automatically presented on the screen as well.

The example shown in FIG. 2 illustrates an exemplary Software Version 216 window that may identify the version of the software. The Software Version 216 window shown identifies the latest version of the software application, the name of the programmer that created the latest version, and the date that the version was last updated. Additional, fewer, and alternative types of information may be presented via the software version window.

The exemplary Other Features 218 window shown in FIG. 2 includes a customization key that permits a user to customize the Quality Inspector. The Other Features 218 window shown includes a "Remove Hard Codings" button that provides access to functionality associated with hard coded values as discussed herein. Additional, fewer, or alternative options and functionality may be provided via the other features window.

B. Hard Coded Values

The Quality Inspector may provide functionality associated with "hard coded" values. As discussed in further detail below, hard coded values may include predetermined constants, standards developed for a programming language, user defined values, literals, text symbols, or other defined values. With some software projects, it may be desirable to identify all hard coded values that have been programmed into the code and remove them from the source code in a timely manner at some point later in time, such as during the final stages of development.

Accordingly, the Quality Inspector may automatically identify all hard coded values in the code associated with an application. The Quality Inspector may replace one or more hard coded values identified with text elements, such as variable names or other character strings. For instance, the Quality Inspector may automatically generate a corresponding text element for each hard coded value identified. Subsequently, the Quality Inspector may automatically replace one or more of the hard coded values with the corresponding text element. Alternatively, the text elements used to replace the hard coded values may be entered by a user. For each hard coded value identified, an error message, a warning, or a suggested change to the code may be presented. Additional, fewer, or alternative types of functionality associated with hard coded values may be provided.

In one embodiment, after all of the hard coded values in a program are automatically identified, the Quality Inspector may present a list of the hard coded values found along with a list of corresponding text elements automatically generated. The user may then select one or more of the hard coded values from the list that the user wants to have replaced by the corresponding text element.

A more detailed discussion of hard coded values follows. Hard coded values may include what are commonly known as literals. Literals are data objects which occupy program memory and may be of a particular type but which do not have a specific name. Literals may be classified as either text or numeric literals. The content or value of a literal may be written directly in the code and used at the exact point in the program where the content or value has been written. The value of a literal cannot be changed during runtime.

A text literal is an alphanumeric character string that may be enclosed within quotations in the code. For example, a text literal may look like "text literal" in the actual source code, i.e., characters surrounded by quotation marks. A numeric literal may include a sequence of numbers. For example, a numeric literal may look like "12345" in the actual source code, i.e., numbers surrounded by quotation marks.

Figure 4:
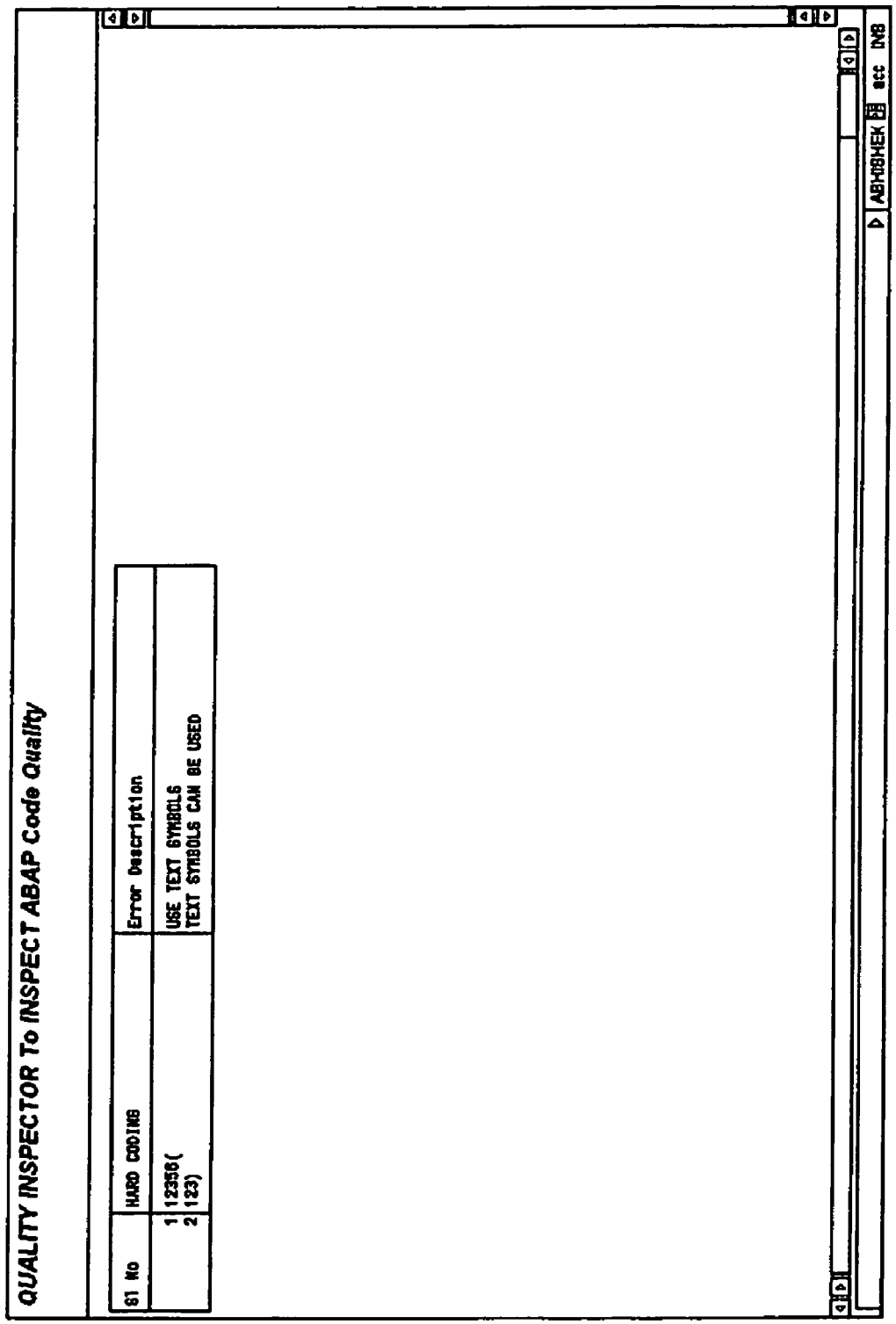
FIG. 4 illustrates an exemplary error report associated with the exemplary hard coded values of FIG. 3.

FIG. 3 illustrates exemplary hard coded values associated with a portion of code associated with a software program. Specially, the "123(" and "12356(" are exemplary hard coded values. FIG. 4 illustrates an exemplary error report generated after the hard coded values of FIG. 3 were identified. The error report shown lists each hard coded value identified and presents an error description corresponding to each hard coded value. In the example shown in FIG. 4, the error descriptions indicate that text symbols may be used to replace the hard coded values in the code. Additional, fewer, or alternative types of information may be presented in an error report.

Hard coded values as defined herein also may include text symbols. Text symbols may act as language-independent substitutes for text literals. The ABAP programming language provides text symbols as data objects having the naming convention of "TEXT-###," where ### is a three digit identifier, such as "TEXT-001." Additional, fewer, or alternative types of hard coded values may be used.

FIG. 5 illustrates exemplary text symbols employed as hard coded values. The text symbols shown are "TEXT-049," "TEXT-096," "TEXT-101," etc. The Quality Inspector may identify all of the text symbols in the code.

FIG. 5 also illustrates an exemplary report summarizing the proposed changes to the code in a Summary Report, as well as the proposed text elements that would be created for each hard coded value identified. The example of FIG. 5 shows a report listing the hard coded values, such as the text symbols, in the left hand column entitled "TEXT NO." The example of FIG. 5 further shows proposed text elements corresponding to each hard coded value in the right hand column entitled "PROPOSED TEXT ELEMENT." From the screen shown in FIG. 5, the Quality Inspector may then automatically, or at the direction of a user, replace some or all of the hard coded values in the code with the corresponding proposed text elements.

As noted above, the Quality Inspector may create text elements, and replace each hard coded value identified with the respective text element. After which, the Quality Inspector may generate one or more indicators indicating which lines will be added to the software program, which lines will be modified, and/or which lines will be deleted after the proposed text elements have replaced the hard coded values in the code.

The Quality Inspector may provide up-to-the-line navigation to a current programming error in the code. The Quality Inspector also may suggest appropriate correction(s) to the code and the user may subsequently automatically correct programming errors via a single operation on an input device, such as a single click of a mouse button.

FIG. 6 illustrates an exemplary display highlighting suggested changes to the code proposed by the Quality Inspector. The proposed changes may be emphasized on the display screen, such as by changing the font, color, or size of the lines of code affected, indicators, icons, or other manners of emphasis. The example shown in FIG. 6 emphasizes the proposed changes via indicators in a middle column. The exemplary indicators shown indicate that a new line has been "INSERTED," or that an existing line has been "MODIFIED" in the proposed changes. Alternatively, the display may color the lines associated with a new line of code inserted one color, the lines associated with modified lines of code a second color, and the unaffected lines of code a third color. Additional, fewer, or alternative manners of emphasis may be used.

The left hand side of FIG. 6 displays the current version of the code that includes hard coded values, such as "TEXT-120" and "TEXT-121." The right hand side of FIG. 6 shows the proposed changes to the code, as well as what the code will look like if the proposed modifications are accepted. As shown in the example, the proposed changes include replacing the hard coded values with corresponding text elements previously illustrated in FIG. 5, i.e., replacing the hard coded value "TEXT-120" with the text element "prog" and the hard coded value "TEXT-121" with the text element "progf." The proposed changes shown also include replacing 4 lines of pre-existing code with only 2 lines of modified code. Hence, the display demonstrates to the programmer that 2 pre-existing lines of code will be deleted, which will reduce the total number of lines of code.

Figure 7:
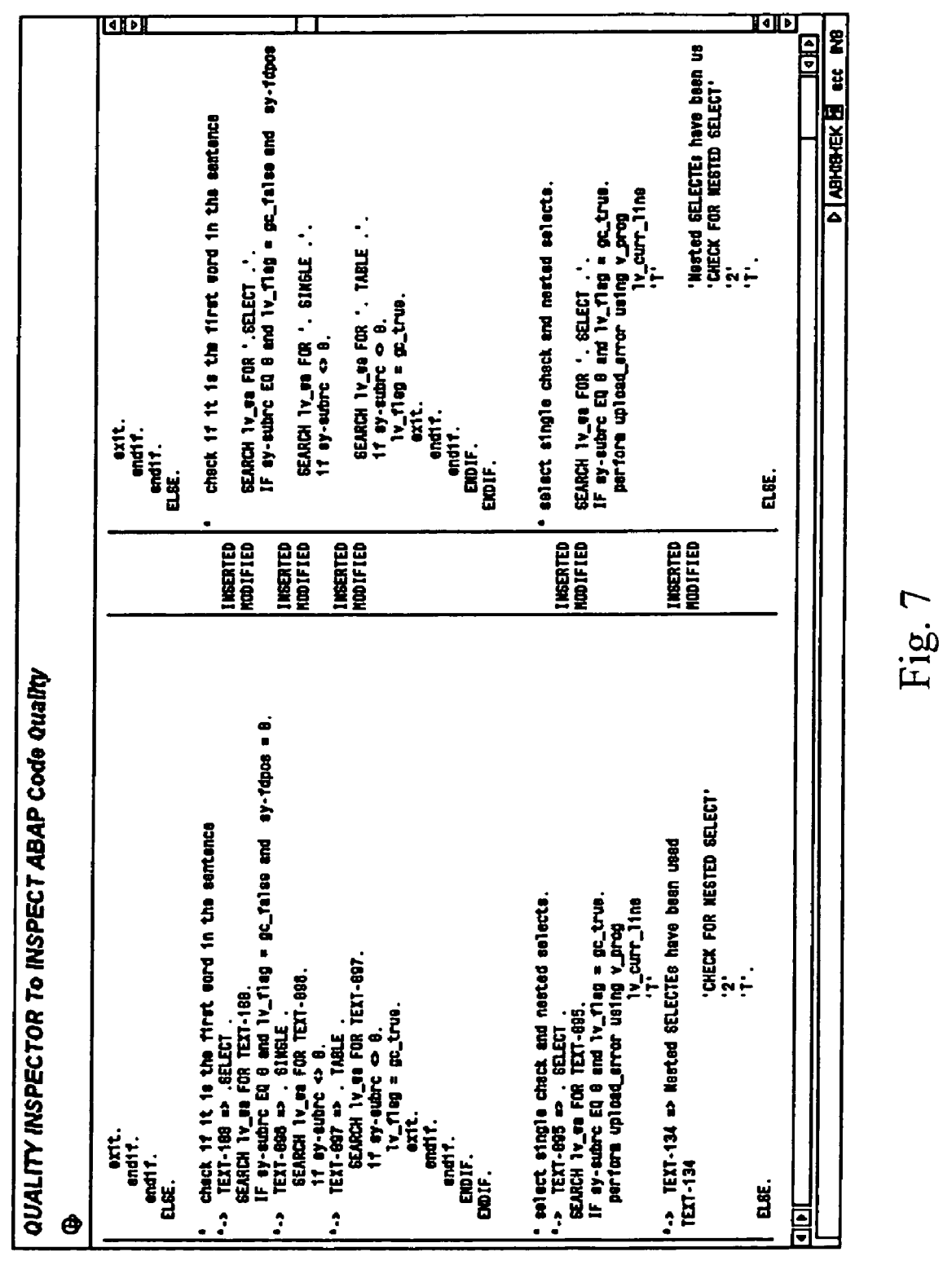

FIG. 7 illustrates another exemplary display highlighting suggested changes to the code proposed by the Quality Inspector. The example of FIG. 7 shows text elements, "SELECT," "SINGLE," and "TABLE," as being suggested replacements for hard coded values "TEXT-100," "TEXT-096," and "TEXT-097," respectively. FIG. 7 also demonstrates additional text elements that are suggested replacements for hard coded values "TEXT-095" and "TEXT-134."

Similar to FIG. 6, FIG. 7 demonstrates that the proposed changes to the code may modify pre-existing lines of code and/or reduce the total number of lines in the current version of the code by deleting extraneous lines. The reduction in the number of lines of code may increase the speed at which the program may be executed at runtime. The proposed changes to the code also may include adding new lines of code to the program.

As shown in FIGS. 6 and 7, the proposed changes to the code may automatically be created in accordance with the programming rules of the programming language being used. The proposed changes to the code also may be automatically created to satisfy other predetermined programming rules. By creating replacement code that satisfies the programming rules or other predetermined standards, the total number of programming errors may be reduced and the remaining portions of code may be edited in a more efficiently.

C. Exemplary Summary Report

In addition to the reports discussed above, the Quality Inspector may analyze the code of a software program for programming errors and present a report summarizing those errors. For example, the report may identify programming errors by type or programming aspect and the location of each error. The Quality Inspector may provide the capability to navigate to a particular line in the code associated with a specific error directly from the summary report. The summary report also may detail programming warnings, as well as programming suggestions that include suggested code intended to replace corresponding portions of code in the software program.

Typically a software project may be broken down into modules, with each module providing for specific functionality in the program. The Quality Inspector may track how many times a program has been reviewed and may maintain a corresponding detailed history of the review. The history may include the identification of who has executed the program, such as by user id number, and when that event occurred. The Quality Inspector also identify which modules currently satisfy predetermined coding standards, and which modules remain to be edited, either entirely or in part. In one embodiment, the history or summary report may detail how many lines have been analyzed in each Include statement or other function called by a main program, as well as how may total lines have been analyzed.

The Quality Inspector may track what, if any, portions of the code are currently being written and/or edited. The Quality Inspector may track the number of total errors associated with each portion of code and/or written by an individual programmer. All of the above information may be presented via a summary report in addition to or in lieu of identifying errors and presenting warnings and programming suggestions. The summary report may present additional, fewer, or alternative items of information associated with the current status of the software project.

The Quality Inspector may perform time analysis. For instance, the summary report generated may detail the time required to execute each process and/or portion of the application. The summary report may present how many variables, field groups, tables, structures, etc. have been used throughout the program. Furthermore, the summary report may distinguish between errors and warnings on the display, such as by coloring errors in one color and warnings in another, or emphasizing errors and warnings differently, such as by font or character size. Other means of emphasis may be used.

From the summary report, a user may access a more detailed report describing each error, warning, and/or programming suggestion in greater detail by performing an operation on an input device, such as by a stroke of a keyboard, a click of a mouse, or a touch of a touch screen/pad. The more detailed information may include the location of the error, the warning, and/or the programming suggestion within the program, such as by line number.

FIG. 8 illustrates an exemplary summary report of code irregularities associated with various programming aspects or predetermined types of categories. The exemplary summary report includes a quality check window 810, a summary window 812, a variables used window 814, and a time display. The summary report may summarize additional, fewer, or alternative programming aspects or categories.

The quality check window 810 may present information related to a number of programming aspects or types of categories for which the Quality Inspection performs a related check or other analysis. The programming aspects shown include checks for beautification, type preferred, internal table, variables, local variables, field-symbols, constants, form parameters, hard coding, SY-SUBRC checks, performance, local performance, and multiple phrases in one line. The programming aspects checked for may be customized or otherwise selected by a user. Additional, fewer, or alternative programming aspects may be used.

For each check point, the quality check window 810 may display the number of corresponding errors, warnings, and suggestions in either a portion of code or the entire code. To view additional information related to the errors, warnings, and suggestions associated with each check point, a user may use an input device to select the errors, warnings, or suggestions associated with a specific check point for which additional information is desired. Subsequently, another display may present the code and/or other information associated with the error, warning, and/or suggestion selected.

The summary window 812 may present information related to the analysis of each Include program or other function called by the main program. The summary window 812 may show the line numbers associated with each Include program or other function that was analyzed. The summary window 812 may present additional, fewer, or alternative types of information.

The variables list window 814 may present information related to the types of variables used throughout the program, as well as the number times of each type of variable was used. As shown, the types of variables may include internal tables, variables, local variables, parameters, field symbols, constants, local constants, performance, and local performance variables. Additional, fewer, or alternative types of variables may be analyzed and summarized via the variables list window.

The Quality Inspector may check performance aspects of a program. In the example shown at the bottom of FIG. 8, the summary report presents a time display that summarizes the time taken to analyze or read the some or all of the portions of the code. The time display may present additional, fewer, or alternative performance related information.

D. Other Exemplary Functionality

An important ABAP system field is SY-SUBRC, the return code. Many typical ABAP statements set SY-SUBRC to zero if execution of the associated code is successful, and otherwise not equal to zero. The Quality Inspector will generate a warning message if the code does not perform a SY-SUBRC check after using certain subroutines, such as "SELECT . . . ENDSELECT," "SELECT SINGLE . . . ", "CALL FUNCTION . . . ," "CALL TRANSACTION USING . . . ," and "READ TABLE . . . " subroutines. Additional, fewer, or alternative SY-SUBRC checks may be performed and summarized.

FIG. 9 illustrates an exemplary report detailing the code irregularities associated within one summary category. From the summary report of FIG. 8 discussed above, a user may access more detailed information related to the irregularities associated with each summary category. The example of FIG. 9 details the type of SY-SUBRC checks not performed by the code and provides a description of each error. For instance, the error descriptions shown indicate that there is no SY- SUBRC check after a number of subroutines were called, such as SELECT SINGLE, read table, etc.

The Quality Inspector may check the code to determine if SELECT SINGLE statements are being used, and if so, if they are being used properly. For example, if SELECT SINGLE statements are being employed, it may be desirable to have the entire primary key specified. Accordingly, if the programmer does not specify the entire primary key, the Quality Inspector may generate a warning.

The Quality Inspector may identify programming structures and subsequently verify that the programming structures satisfy the programming rules governing the specific programming language. For instance, the Quality Inspector may check the order of a SELECT routine. If the order of the selection is wrong in a "SELECT function 1 function 2 . . . " statement, then a warning may be generated.

The Quality Inspector may check "LOOP AT" statements. If the control break AT command is used improperly within the loop then a warning may be generated.

The Quality Inspector also may identify nested programming structures and verify that each nested programming structure satisfies the programming rules. In one embodiment, the Quality Inspector may check for nested SELECTS, such as code similar to

```
SELECT * FROM . . .
    SELECT SINGLE * FROM
END SELECT.
```

If there is a violation of the programming rules governing nested SELECTS, a warning may be generated.

In another embodiment, the Quality Inspector may analyze the code associated with nested LOOPS, such as code similar to

```
LOOP AT ITAB1
    LOOP AT ITAB2
    ENDLOOP
ENDLOOP.
```

If there is an error in the rules governing nested LOOPS, an error may be generated.

The Quality Inspector may check TYPE PREFERRED THAN LIKE statements. In a data declaration, if the variable has been declared using LIKE, then a warning may be generated. A preference may be given to the TYPE. Additional, fewer, and alternative functionality related to identifying errors associated with programming structures associated with the programming rules of a programming language may be used.

The Quality Inspector may provide functionality related to beautification of the code, in addition to conforming the code to predetermined coding standards and naming conventions. For instance, the Quality Inspector may check for blank lines between lines of code and comments. In one embodiment, the Quality Inspector determines if there is exactly a one line gap between lines of the code and a comment. If there is more than one line between the code and a comment, a suggestion may be generated related to deleting the unnecessary blank line. On the other hand, if there is no gap, a warning may be generated.

The Quality Inspector may check for the alignment of comments with the functional code. If the functional code and one or more corresponding comments are not aligned, an error or warning may be generated.

The Quality Inspector may determine if there are extra periods or other punctuation in one line. If there extraneous periods or other punctuation found in one line, an error or warning may be generated. Additional, fewer, or alternative beautification checks may be performed.

The Quality Inspector may inspect a single line of code for certain multiple phrases, each phrase being associated with a predefined function associated with a programming language. In one embodiment, the programming language is ABAP and the Quality Inspector checks a single line of code for having more than one of the following phrases: SELECT & WHERE, SELECT & INTO, SELECT & ENDSELECT, SELECT & OR, FROM & WHERE, FROM & INTO, FROM & ENDSELECT, FROM & AND, FROM & OR, WHERE & INTO, WHERE & AND, IF & AND, AND & OR, IF & OR, IF & END IF. Additional, fewer, or alternative key words or phrases in a single line of code may be checked for.

The Quality Inspector provides customization functionality that may enhance its versatility and make it more globally useable than conventional editors. In one embodiment, the Quality Inspector facilitates the establishment of project specific conventions. After the project specific conventions have been established, subsequent users may be restricted to use a corresponding standard set of programming features. Additionally, a password or other key may be employed to prevent the project specific settings from being altered.

FIG. 10 illustrates an exemplary customization report. As shown, an on/off button may identify whether the corresponding programming aspect has been analyzed or not. If a naming convention is set blank, then the Quality Inspector may scan for that naming convention but will not raise any naming convention errors identified. If the on/off box is not checked for a corresponding data type, then that data type may not be checked. As shown in the example of FIG. 10, a user may customize the Quality Inspector to check for errors associated with variable initialization, hard coding, SELECT SINGLE statements, NESTED SELECTS statements, the order within SELECT statements, SY-SUBRC checks, NESTED LOOP statements, LOOP statements, TYPE PREFERRED THAN LIKE statements, beatification aspects, multiple phrases in a single line, and other errors. Additional, fewer, or alternative errors that are checked for may be customized.

Figure 11:
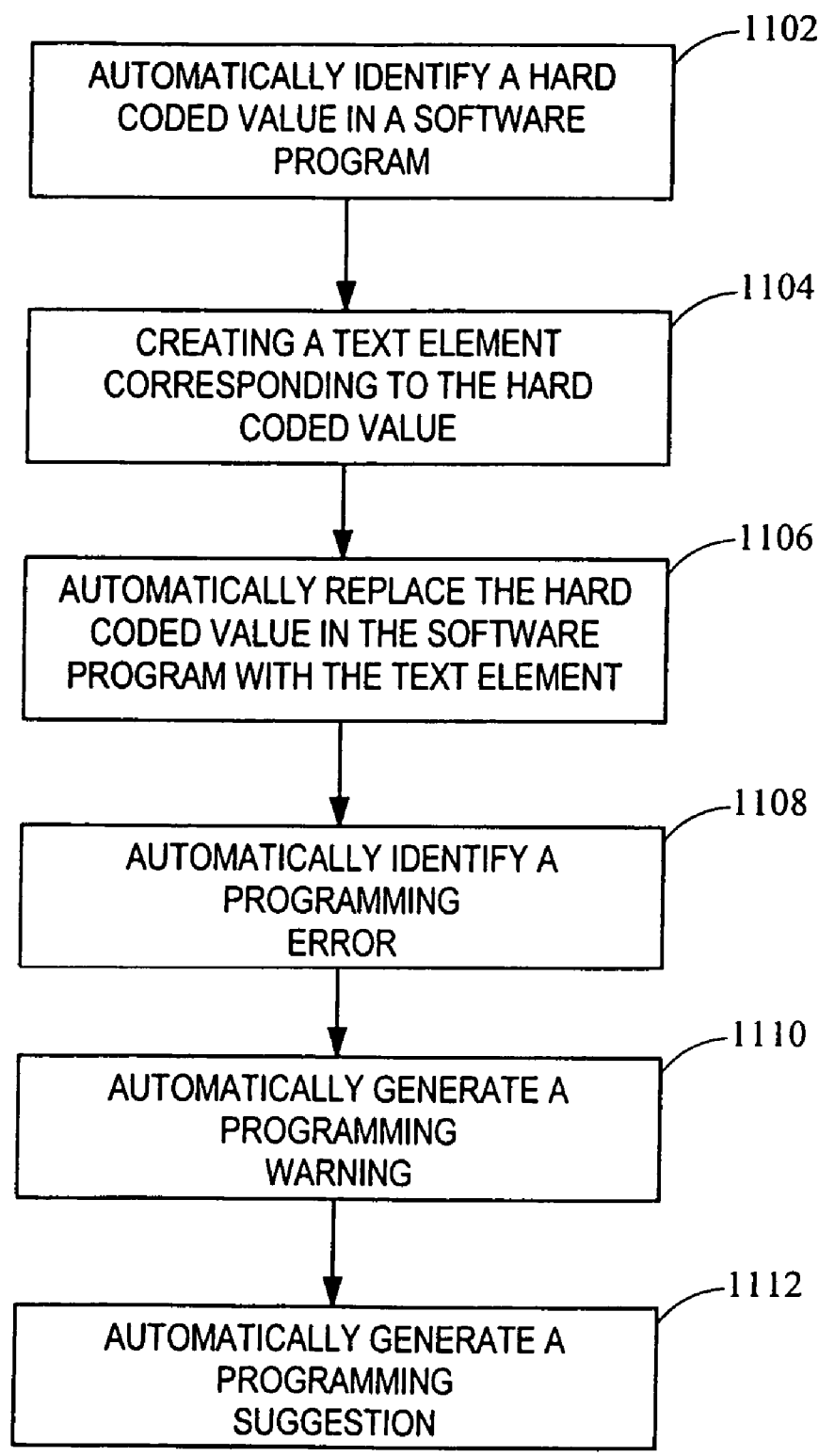
FIG. 11 illustrates an exemplary method of inspecting the quality of code.

FIG. 11 illustrates an exemplary method of automatically inspecting code quality. The method may include automatically identifying a hard coded value in a software program 1102, creating a text element corresponding to the hard coded value 1104, automatically replacing the hard coded value in the software program with the text element 1106, automatically identifying a programming error 1108, automatically generating a programming warning 1110, and automatically generating a programming suggestion 1112. The method may include additional, fewer, or alternative actions.

The method may include automatically identifying a hard coded value in a software program 1102. The software program may be written in a programming language, including but not limited to the ABAP language operable to create SAP applications. The software program may include hard coded values as defined herein, such as text or numeric literals. Additional, fewer, or alternative hard coded values may be automatically identified.

The method may include creating a text element corresponding to the hard coded value 1104. The text element may be automatically created by a computer, processing, or other device. In the alternative, the text element may be created by the user and entered via an input device, such as a keyboard, voice recognition means, or other input means.

The method may include automatically replacing the hard coded value in the software program with the text element 1106. The method may include presenting a list of hard coded values identified next to a list of corresponding text elements. A user may then determine whether some or all of the hard coded values should be replaced by the corresponding text elements in the code.

The method may include automatically identifying at least one programming error 1108. The programming error may be associated with a first specific portion of code written in the programming language. The programming error may correspond to code that is currently improperly written according to the programming rules of the programming language. One or more programming errors may be summarized and presented to a user via a report displayed on a screen. Detailed information related to each error may be presented upon request.

The method may include automatically generating a programming warning 1110. The programming warning may be associated with a second specific portion of code written in the programming language, the second specific portion may be either the same as or different than the first specific portion of code. The second specific portion may be automatically identified as being code that may impede the proper execution of the software program. One or more programming warnings may be summarized and presented to a user via a report displayed on a screen. Detailed information related to each warning may be presented upon request.

The method may include automatically generating a programming suggestion 1112. The programming suggestion may be associated with a third specific portion of code written in the programming language, the third specific portion may be either the same as or different than either the first or second specific portion of code, or both. The third specific portion may be automatically identified as being code that may have a more efficient or correct manner of being drafted accordingly to the programming rules of the programming language. Detailed information related to each programming suggestion may be presented upon request.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed is:

1. A computer-implemented method comprising:
    automatically identifying a reference to a hard coded value in a first version of a software program written in a programming language, wherein the hard coded value comprises a text symbol that is a language-independent substitute for a text literal, and wherein the reference to the hard coded value in the first version of the software program also references a text element corresponding to the hard coded value;
    automatically identifying the text element corresponding to the hard coded value;
    receiving a direction from a user to replace some or all instances of the hard coded value in the first version of the software code with the corresponding, automatically identified text element; and
    automatically creating an updated version of the software program that replaces at least one instance of the hard coded value in the first version of the software program with the text element, and that deletes the reference to the hard coded value.

2. The method of claim 1, comprising:
    simultaneously displaying a portion of the first version of the software program containing the reference to the hard coded value identified on a first part of a display screen, and a portion of the updated version of the software program containing the text element corresponding to the hard coded value on a second part of the display screen.

3. The method of claim 1, wherein the programming language is an Advanced Business Application Programming (ABAP) language.

4. The method of claim 2, further comprising displaying one or more indicators between the portion displaying the first version and the portion displaying the updated version, the one or more indicators identifying portions of the programming code that have been affected by changes.

5. The method of claim 1, wherein the reference to the hard coded value includes a naming convention of "TEXT-###", wherein ### comprises a three digit identifier.

6. The method of claim 1, further comprising:
    providing a user interface that identifies the reference to the hard coded value and the corresponding text element.

7. The method of claim 6, wherein the direction is received from the user through the user interface.

8. A system comprising:
    one or more computers; and
    a computer-readable medium coupled to the one or more computers having instructions stored thereon which, when executed by the one or more computers, cause the one or more computers to perform operations comprising:
    automatically identifying a reference to a hard coded value in a first version of a software program written in a programming language, wherein the hard coded value comprises a text symbol that is a language-independent substitute for a text literal, and wherein the reference to the hard coded value in the first version of the software program also references a text element corresponding to the hard coded value,
    automatically identifying the text element corresponding to the hard coded value,
    receiving a direction from a user to replace some or all instances of the hard coded value in the first version of the software code with the corresponding, automatically identified text element, and
    automatically creating an updated version of the software program that replaces at least one instance of the hard coded value in the first version of the software program with the text element, and that deletes the reference to the hard coded value.

9. The system of claim 8, wherein the operations comprise:
    simultaneously displaying a portion of the first version of the software program containing the reference to the hard coded value identified on a first part of a display screen, and a portion of the updated version of the software program containing the text element corresponding to the hard coded value on a second part of the display screen.

10. The system of claim 9, wherein the operations comprise displaying one or more indicators between the portion displaying the first version and the portion displaying the updated version, the one or more indicators identifying portions of the programming code that have been affected by changes.

11. The system of claim 8, wherein the programming language is an Advanced Business Application Programming (ABAP) language.

12. The system of claim 1, wherein the reference to the hard coded value includes a naming convention of "TEXT-###", wherein ### comprises a three digit identifier.

13. The system of claim 1, wherein the operations comprise:
providing a user interface that identifies the reference to the hard coded value and the corresponding text element.

14. The system of claim 13, wherein the direction is received from the user through the user interface.

15. A non-transitory computer storage medium encoded with a computer program, the program comprising instructions that when executed by one or more computers cause the one or more computers to perform operations comprising:
automatically identifying a reference to a hard coded value in a first version of a software program written in a programming language, wherein the hard coded value comprises a text symbol that is a language-independent substitute for a text literal, and wherein the reference to the hard coded value in the first version of the software program also references a text element corresponding to the hard coded value;
automatically identifying the text element corresponding to the hard coded value;
receiving a direction from a user to replace some or all instances of the hard coded value in the first version of the software code with the corresponding, automatically identified text element; and
automatically creating an updated version of the software program that replaces at least one instance of the hard coded value in the first version of the software program with the text element, and that deletes the reference to the hard coded value.

16. The computer storage medium of claim 15, wherein the operations comprise:
simulatenously displaying a portion of the first version of the software program containing the reference to the hard coded value identified on a first part of a display screen, and a portion of the updated version of the software program containing the text element corresponding to the hard coded value on a second part of the display screen.

17. The computer storage medium of claim 15, wherein the programming language is an Advanced Business Application Programming (ABAP) language.

18. The computer storage medium of claim 16, wherein the operations comprise displaying one or more indicators between the portion displaying the first version and the portion displaying the updated version, the one or more indicators identifying portions of the programming code that have been affected by changes.

19. The computer storage medium of claim 15, wherein the reference to the hard coded value includes a naming convention of "TEXT-###", wherein ### comprises a three digit identifier.

20. The computer storage medium of claim 15, wherein the operations comprise:
providing a user interface that identifies the reference to the hard coded value and the corresponding text element.

21. The computer storage medium of claim 20, wherein the direction is received from the user through the user interface.

* * * * *

UNITED STATES PATENT AND TRADEMARK OFFICE
CERTIFICATE OF CORRECTION

| | | |
|---|---|---|
| PATENT NO. | : 7,945,905 B2 | Page 1 of 1 |
| APPLICATION NO. | : 11/446498 | |
| DATED | : May 17, 2011 | |
| INVENTOR(S) | : Abhishek Kumar | |

It is certified that error appears in the above-identified patent and that said Letters Patent is hereby corrected as shown below:

Cover page, item (75) Inventors:, line 1, delete "Bandhup" and replace with --Bhandup--;

At column 20, line 12, delete "simulatenously" and replace with --simultaneously--.

Signed and Sealed this
Second Day of August, 2011

David J. Kappos
*Director of the United States Patent and Trademark Office*